United States Patent [19]

Maeda et al.

[11] 4,060,467
[45] Nov. 29, 1977

[54] ELECTROLYTIC MACHINING SYSTEM

[75] Inventors: Sachio Maeda, Machida; Nagoa Saito, Nagoya; Shinji Arai, Nagoya; Yuichiro Haishi, Nagoya, all of Japan

[73] Assignee: Mitsubishi Denki Kabushiki Kaisha, Japan

[21] Appl. No.: 549,438

[22] Filed: Feb. 12, 1975

Related U.S. Application Data

[63] Continuation-in-part of Ser. No. 104,467, Jan. 15, 1971, abandoned.

[51] Int. Cl.$^2$ ............................................. C25F 3/02
[52] U.S. Cl. ............................. 204/129.75; 204/129.4
[58] Field of Search ........... 204/129.4, 129.43, 129.46, 204/129.75

[56] References Cited

U.S. PATENT DOCUMENTS

| Re. 26,620 | 7/1969 | Inoue | 204/129.43 |
| 2,803,596 | 8/1957 | Brown | 204/129.75 |
| 2,939,825 | 4/1956 | Faust et al. | 204/129.46 |

FOREIGN PATENT DOCUMENTS

| 40-22168 | 10/1965 | Japan | 204/129.75 |
| 40-22043 | 9/1965 | Japan | 204/129.75 |

*Primary Examiner*—T. Tung
*Attorney, Agent, or Firm*—Robert E. Burns; Emmanuel J. Lobato; Bruce L. Adams

[57] ABSTRACT

A workpiece consisting essentially of sintered tungsten carbide alloy having added thereto titanium carbide and/or tantalum carbide is electrolytically machined using an aqueous electrolyte solution consisting essentially of 5% to saturated value by weight of an alkali metal chloride selected from the group consisting of sodium chloride and potassium chloride, and an alkali metal compound selected from the group consisting of 3.6%–5.3% by weight of sodium hydroxide, up to 7.5% by weight of potassium hydroxide, up to 7.1% by weight of sodium carbonate, up to 9.2% by weight of potassium carbonate, up to 11.2% by weight of sodium bicarbonate, and up to 13.3% by weight of potassium bicarbonate. The workpiece is positioned opposite a machining electrode with a small machining gap therebetween and an alternating electric current is passed serially through the electrolyte solution in the machining gap, through the workpiece and through the machining electrode to render the workpiece anodic during part of the alternating current cycle so as to form oxides including water-insoluble tungsten oxide and titanium oxide and/or tantalum oxide on the workpiece surface and to render the workpiece cathodic during the reverse part of the alternating current cycle so as to cause the water-insoluble oxides to react with alkali metal ions in the electrolyte solution to form reaction products which are soluble in water to thereby dissolve the oxides and prevent oxide accumulation on the workpiece surface.

13 Claims, 21 Drawing Figures

EFFECT OF ADDED NaOH (WITH BIASING RESISTANCE MAINTAINED AT 0.3 OHM)

EFFECT OF BIASING RESISTANCE (WITH CONTENT OF NaOH MAINTAINED AT 4%)

ELECTROLYTIC MACHINING SYSTEM

This is a continuation-in-part of our copending U.S. application Ser. No. 104,467 filed Jan. 15, 1971, now abandoned.

BACKGROUND OF THE INVENTION

This invention relates to an electrolytic machining system and an electrolytic method for forming recesses, bores, patterns etc. on surfaces of workpieces of sintered tungsten carbide alloys.

In general, an electrolytic machining apparatus is comprised of a machining electrode disposed opposite to a surface portion of a workpiece to be machined, and an electrolyte which circulates as a machining liquid through a small gap formed between the machining electrode and the workpiece. Means is provided for electrolyzing the electrolyte with the workpiece, as an anode electrode and the machining electrode, as an electrolyzing electrode, in order to sink or erode a predetermined portion of the workpiece's surface into a desired recess, bore, pattern or the like.

The erosion of the workpiece during this machining operation appears to result from the anodic dissolution which occurs during the electrolysis of the electrolyte. Therefore, it has been common practice to provide, as a machining source of electric power, a source of electric power derived from the rectification of commercial alternating current power, and to connect the positive terminal of the machining source to the workpiece while connecting its negative terminal to the machining electrode, thereby electrolyzing the electrolyte with power from direct current.

Also, the erosion of the workpiece is restricted to the surface portion to be machined and more particularly to that portion of the workpiece's surface which is opposite to the machining electrode which is separated from the workpiece by a very small gap, and the configuration in which the workpiece is eroded is determined by the configuration of the machining electrode. For these reasons, the machining electrode has been used ordinarily which has a configuration substantially complementary to that of the recess, bore or pattern etc. to be formed on the workpiece.

Further, as will be readily understood, the type of electrolyte used depends upon the particular material of the workpiece. The criteria for the selection of the electrolyte involves its cheapness and easy availability as well as its harmlessness for an operator and so on. Accordingly, an aqueous solution of sodium chloride has been commonly used.

With recent development of the electrolytic machining technique as above outlined, its application has been extended to the field of machining sintered tungsten carbide alloy materials, which are increasingly utilized as tool means for working various machines and devices. In this way the characteristic features of this technique may be efficiently put to practical use, namely, materials which are too hard to be machined by the ordinary machining technique can be machined easily, by an electrolytic method provided that they are electrically conductive; complicated configuration such as recesses, bores, patterns and the like can be easily formed; and workpieces can be machined at high speeds and without cracks as compared with electrospark machining techniques used for the same purposes.

It is well known that sintered tungsten carbide alloy materials are sintered materials of tungsten carbide, WC, with cobalt and/or the like as a binder or such materials having added thereto titanium carbide TiC, and/or tantalum carbide TaC. However, it has been found that the practice of the conventional electrolytic machining processes using a source of direct current, having its positive terminal connected to a workpiece and its negative terminal connected to a machining electrode and using an aqueous solution of sodium chloride as an electrolyte, so that the electrolyte is electrolyzed with power from direct current hardly leads to erosion of a tungsten carbide alloy workpiece, for reasons which will be subsequently explained.

Under these circumstances, i.e., using as an electrolyte an aqueous solution of sodium chloride and direct current, the respective metals contained in a workpiece of tungsten carbide alloy, which is now an anode electrode are oxidized as follows:

$$WC \rightarrow WO_3$$

$$TiC \rightarrow TiO_2$$

$$TaC \rightarrow Ta_2O_5$$

$$Co \rightarrow CoCl_2$$

Among the products formed by these chemical reactions cobalt chloride $CoCl_2$ is subsequently reacted with hydroxyl group in the electrolyte solution to form cobalt hydroxide $Co(OH)_2$ which, in turn, is dispersed into the solution. On the other hand, the remaining products, tungsten oxide $WO_3$, titanium oxide $TiO_2$ and tantalum oxide $Ta_2O_5$ are not subject to such reactions and remain, adhering to the surface of the workpiece. This appears to result in the stoppage of electrolytic machining of the sintered tungsten carbide alloys.

In order to cause the electrolytic machining of sintered tungsten carbide alloy materials to proceed, the oxides of tungsten, titanium and/or tantalum must be removed from the surface of the workpiece, preferably by dissolution into the electrolyte solution. In this connection, however, it is to be noted that the electrolyte solution should be selected on the bases that it is harmless for an operator, suitable for effecting efficient machining and that it is not deteriorated during long service.

Also it is to be noted that the machining electrode used should not be consumable due to its erosion in operation. Any wear of the machining electrode in operation leads to a serious disadvantage, namely, that those portions of a workpiece's surface other than the predetermined surface portion may be eroded to form a recess, bore, pattern or the like having an undesired configuration, resulting in a decrease of the degree of machining accuracy. Further it will be readily understood that a machining source of electric power and other elements should not cause any wear of the machining electrode in operation.

SUMMARY OF THE INVENTION

An object of the invention is to provide an improved electrolytic machining method and system for sintered tungsten carbide alloy materials free from any impediment to the electrolytic erosion operation on the alloys, for efficiently forming recesses, bores, patterns and the like on the bodies of the alloy materials.

Another object of the invention is to provide an improved electrolytic machining method and system for sintered tungsten carbide alloy materials using an improved electrolyte solution, which is harmless for an operator, by means of which, workpieces of sintered tungsten carbide alloy materials can be electrolytically eroded with a high degree of efficiency, thereby to efficiently form recesses, bores, patterns and the like on the surfaces of the workpieces.

A further object of the invention is to provide an improved method and system for electrolytically machining sintered tungsten carbide alloy materials with a high degree of machining accuracy, and whereby the machining electrode is substantially prevented from wearing.

A still further object of the invention is to provide an improved electrolytic machining method and system for efficiently working sintered tungsten carbide alloy materials, by using an improved electrolyte solution for effecting efficient erosion of the alloy materials, wherein the machining electrode is substantially prevented from being deteriorated during long service.

Another object of the invention is to provide an improved electrolytic machining method and system for efficiently machining sintered tungsten carbide alloy materials with a high degree of machining accuracy, and wherein the machining electrode is substantially completely prevented from wearing.

An additional object of the invention is to provide an improved electrolyte solution especially suitable for use in electrolytically machining sintered tungsten carbide alloy materials.

With the above cited objects in view, the invention resides in a method for electrolytically machining a workpiece of tungsten carbide alloy which comprises positioning a machining electrode opposite a surface portion of said workpiece to form a small machining gap therebetween, flowing an electrolyte comprised of an aqueous solution containing sodium chloride or potassium chloride through said machining gap, passing electric current which is periodically reversed in polarity through said electrolyte in said machining gap, through said workpiece and through said machining electrode.

It has been found that this method may be carried out in a system comprising a machining electrode disposed oppositely to the workpiece to form a very small machining gap therebetween, an aqueous electrolyte solution containing sodium chloride or potassium chloride, means for supplying the electrolyte solution so as to flow through the machining gap, a source of electrical energy, and means electrically connected to the source of electrical energy for converting the electrical energy from the source into an electrical energy periodically reversed in polarity and for supplying the polarity reversed electrical energy to the machining gap through the workpiece and the machining electrode.

BRIEF DESCRIPTION OF THE DRAWINGS

The invention will become readily apparent from the following detailed description taken in conjunction with the accompanying drawings in which:

Referring now to FIG. 1, there is illustrated an electrolytic machining apparatus constructed in accordance with the teachings of the invention. The apparatus illustrates a machining workpiece 1 composed of a sintered tungsten carbide alloy material such as previously described, and comprises a machining electrode 2 disposed to form a machining gap 3 between the electrode and the workpiece. A machining enclosure 4 encloses the workpiece 1 and the machining electrode 2 and serves to prevent gas and the like produced by the electrolytic operation taking place in the machining gap 3, from being scattered into the surroundings. In order to hermetically seal the enclosure 4, a pair of bellows 5 close the top of the enclosure 4, with the machining electrode 2 sandwiched between the adjacent ends of two bellows. This arrangement permits the machining electrode 2 to move both longitudinally and laterally. Disposed within the enclosure 4 are a ventilation fan 6 and a supporting base 7 on which the workpiece 1 is fixedly placed.

As shown in FIG. 1, a reservoir 8 in which an electrolyte solution 9, for example, an aqueous solution of 20% sodium chloride is contained is disposed outside the enclosure 4, and a feed pump 10 is operatively coupled to the reservoir 8 through a suction pipe or a horse 11. In operation, the feed pump 10 feeds the electrolyte solution 9 from the reservoir 8 into the enclosure 4 through the suction pipe 11, the pump, a conduit of a hose 12 connected to a central bore 13 extending through the machining electrode 2 and open in the machining gap 3. A return pipe 12' connects the enclosure 4 to the reservoir 8.

Figure 1:
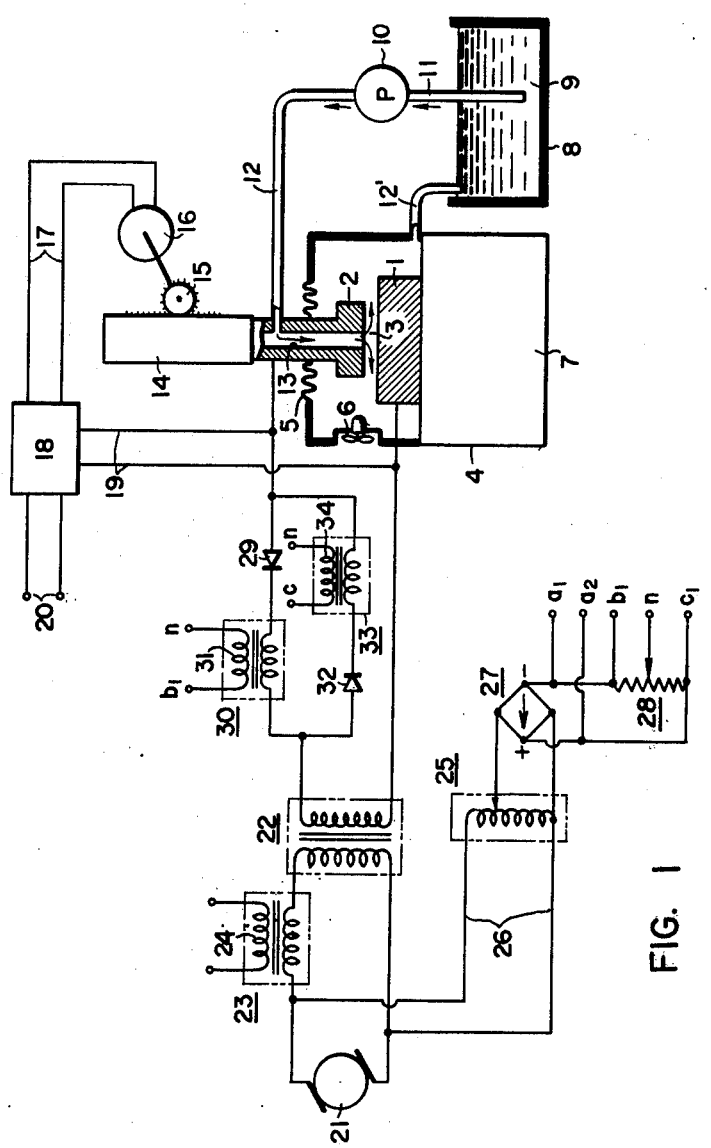
FIG. 1 shows a schematic view, illustrated partly in an electric circuit diagram, of an electrolytic machining apparatus embodying the invention.

The machining electrode 2 is secured at the upper end to a driving shaft 14 formed on one side with a toothed portion adapted to mesh a driving gear 15. The gear 15 can be driven by a servomotor 16 connected through conductors 17 to a servoamplifier 18 adapted to detect a voltage applied across the workpiece 1 and the electrode 2 or a gap voltage through conductors 19 connected to the workpiece and electrode and to amplify the same. The reference numeral 20 designates source terminals through which the amplifer 18 is energized by any suitable source of electric power (not shown).

In order to supply electric energy across the machining gap 3, a power unit comprises a source of alternating current 21, a power transformer 22 connected to the source 21 through a saturable core reactor 23 including an exciting winding 24. The power transformer 21 has its output electrically coupled to the workpiece 1 and the machining electrode 2. The source 26 is also connected to a voltage regulator 25 through conductors 26. The voltage regulator 25 has its output connected to a full wave rectifier bridge 27 having output terminals $a_1$ and $a_2$ connected to the exciting winding 24 of the saturable core reactor 23. Connected across the output terminals $a_1$ and $a_2$ is a resistor 28 including a pair of end terminals $b_1$ and $c_1$ and an intermediate terminal $n$.

The machining electrode 2 is connected to a rectifier or a semiconductor diode 29 poled to permit that portion of the electrical energy supplied by the power transformer 22 across the machining gap 3 having such a polarity that the workpiece 1 acts as an anode electrode while the electrode 2 acts as a cathode electrode to flow therethrough but to prevent that portion of the electrical energy having the opposite polarity from flowing therethrough. The diode 29 has serially connected thereto a saturable core reactor 30 including an exciting winding 31 conncted across the terminals $b_1$ and $n$ of the resistor 28 and also has connected in parallel thereto a saturable core reactor 33 including an exciting winding 34 connected across the terminals $c_1$ and $n$ of the resistor 28. Another rectifier or a semiconductor diode 32 is connected in parallel to both the diode 29 and the saturable core reactor 30 and also in series to a saturable core reactor 33 and is poled reversely from the diode 29.

The apparatus illustrated in FIG. 1 is operated as follows:

The feed pump 10 is operated to circulate the electrolyte solution 9 from the reservoir 8 through the suction pipe 11, the pump 10, the conduit 12 and the central bore 13 in the machining electrode 2 into the machining gap 3 as designated by the arrow shown in FIG. 1 and thence back to the reservoir 8 through the return pipe 12'. At the same time, the source 17 is operated to supply the electrical energy across the machining gap 3 in such a manner that that portion of the electrical energy causing the workpiece 1 to act as the anode electrode is transmitted to the gap 3 through the diode 29 and the saturable core reactor 30 while that portion of the electrical energy causing the workpiece 1 to act as the cathode electrode is transmitted to the gap through the diode 32 and the saturable core reactor 33. The electrical energy thus supplied across the gap causes electrolysis of the electrolyte solution 9.

As above described, the electrical energy supplied across the machining gap 3 periodically reverses its polarity. In other words, the workpiece 1 is at potential positive with respect to the machining electrode 2 in one half cycle of the electrical energy whereas it is at a potential negative with respect to the electrode in the other half of each cycle.

In the one half cycle of the electrical energy in which the workpiece acts as the anode electrode, the carbides of tungsten, titanium and tantalum contained in the material for the workpiece are covnerted as follows:

$$WC \rightarrow WO_3$$

$$TiC \rightarrow TiO_2$$

$$TaC \rightarrow Ta_2O_5$$

These oxides are insoluble in water and remain adhering to the surface of the workpiece. On the other hand, cobalt contained in the material is changed into cobalt chloride $CoCl_2$ and then into cobalt hydroxide $Co(OH)_2$. These reactions are the same as those effected when an electrical energy of direct current is used as previously described.

In the next half cycle in which the workpiece acts as the cathode electrode, the oxides produced in the preceding half cycle react with sodium ions $Na^+$, liberated in the electrolytic solution, to form sodium tungstate, sodium titanate, and sodium tantalate according to the following reactions:

$$WO_3 + Na^+ \rightarrow Na_2WO_4,$$

$$TiO_2 + Na^+ \rightarrow Na_2TiO_3$$

and $$Ta_2O_5 + Na^+ \rightarrow Na_3TaO_4.$$

All these reaction products are soluble in water and dissolve in the electrolyte solution.

Thus it will be appreciated that in each half cycle of the electrical energy in which the workpiece 1 acts as the anode electrode, the binder, cobalt is removed from the workpiece and dissolved into the electrolyte solution while in each next half cycle in which the workpiece acts as the cathode electrode the carbides of tungsten, titanium and tantalum are removed from the workpiece and dissolved, as the respective sodium compounds, into the electrolyte solution with the result that the workpiece is subject to electrolytic erosion.

It is to be noted that this erosion takes place only on that limited surface portion of the workpiece 1 opposing the machining electrode 2, and separated therefrom by a very small gap. More specifically, when the lower end face of the machining electrode 2 opposes the surface of the workpiece 1 through the very small gap 3, only that portion of the workpiece's surface opposing the end face of the electrode is eroded in a limited manner, whereby the erosion proceeds to form on the associated surface portion of the workpiece, a configuration complementary to that of the lower end face of the machining electrode.

As the erosion of the workpiece proceeds, the machining gap 3 is increased in width thereby decreasing the rate of erosion. In order to compensate for the decrease in erosion rate, the machining electrode 2 can be automatically moved toward the workpiece 1 in the following manner. An increase in the width of the machining gap 3 causes an increase in machining voltage applied across the gap which in turn causes an increase in the input to the servoamplifier 18. This permits the amplifier to provide an output signal for driving the driving gear 15 to move the driving shaft 14 downwardly, until the voltage across the gap and therefore the spacing of the gap again reaches a predetermined magnitude. In this way, the workpiece 1 is eroded by the electrolysis of the electrolyte solution with a desired configuration complementary to that of the lower end face of the machining electrode.

It has been found that the apparatus illustrated in FIG. 1 electrolytically machines workpieces of sintered tungsten carbide alloy materials, to form desired recesses, bores, patterns or the like on the workpieces at high rates and with a very high degree of accuracy.

While the apparatus of the invention illustrated in FIG. 1 has been described in terms of the aqueous solution of sodium chloride which is completely harmless for an operator, any other electrolyte solution may be used equally well as long as the solution is harmless. An example of such suitable solutions is an aqueous solution of potassium chloride. In this case the chemical reactions effected during electrolysis of the solution are similar to those previously described in conjunction with the aqueous solution of sodium chloride, except that sodium is replaced by potassium.

Figure 2:
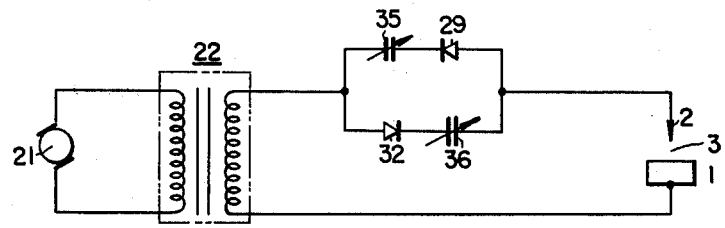
FIGS. 2 and 3 are schematic diagrams of electric circuits constructed in accordance with the invention.
Figure 3:
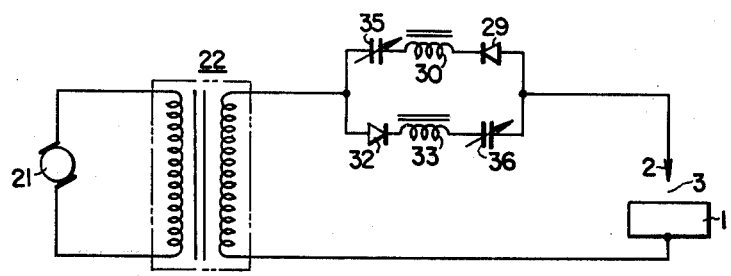

Referring now to FIGS. 2 and 3 wherein the same reference numerals designate the components corresponding to those shown in FIG. 1, there are illustrated modifications of the electric circuitry shown in FIG. 1. By comparing FIGS. 2 and 3 with FIG. 1 it will be apparent that a circuitry of FIG. 2 includes a pair of variable capacitors 35 and 36 substituting the saturable core reactors 30 and 33 shown in FIG. 1 respectively and that a circuitry of FIG. 3 includes a pair of variable capacitors 35 and 36 connected in series with one saturable core reactors 30 and 33 respectively.

As in FIG. 1, each of the circuitry illustrated in FIGS. 2 and 3 is effective for supplying to a machining gap 3 an electrical energy periodically reversed in polarity to electrolyze an electrolyte solution 9 in the gap, whereby a workpiece 1 of sintered tungsten carbide alloy material is electrolytically machined with high efficiency.

Figure 4:
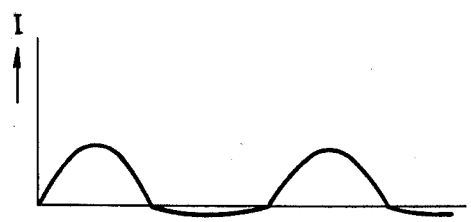
FIG. 4 is a diagram of a waveform of current flowing through a machining gap in apparatus illustrated in each of FIGS. 1, 2 and 3.

According to another feature of the invention, workpieces of sintered tungsten carbide alloy materials can be electrolytically machined with a high efficiency and with negligible wear of the machining electrode in operation.

Where a workpiece is electrolytically machined by ac electrical energy supplied to the machining gap, as previously described in conjunction with FIGS. 1, 2 and 3, the machining electrode when acting as an anode electrode may be eroded and wears resulting in a decreasing degree of machining. In order to avoid wear of the machining electrode, and in accordance with one of the features of the invention a current having a waveform as illustrated in FIG. 4 is supplied to the machining gap 3. In other words, that portion of the electrical energy having such a polarity that the workpiece 1 acts as the anode electrode is supplied to the machining gap with a high amplitude, while that portion of the electrical energy having the opposite polarity is sufficiently suppressed. However, it is to be noted that the electrical energy portion of the opposite polarity should not be completely suppressed. This results from the fact that electrical energy, having a polarity such that the workpiece acts as the cathode electrode, functions to combine the oxides of tungsten, titanium and tantalum with sodium ions in the electrolyte solution, thus dissolving the resulting compounds in the solution, as will be understood from the above mentioned reactions. Thus the energy of such a polarity greatly contributes to speeding up the electrolytic machining. However, if the electrical energy of that polarity is completely suppressed, the machining of the workpiece will not proceed.

All the circuitry illustrated in FIGS. 1, 2 and 3 can provide a current waveform shown in FIG. 4. For this purpose, the circuitry shown in FIG. 1 includes the resistor 28 having the intermediate terminal $n$ variable in position relative to the main body of the same. More specifically, a movement of the intermediate terminal $n$ toward the lower terminal $c_1$ as viewed in FIG. 1 causes a decrease in output across the terminals $n$ and $c_1$ and hence in a dc exciting current supplied across the exciting winding 34 of the saturable core reactor 33, resulting in an increase in impedance of the reactor 33. At the same time, a voltage across the terminals $b_1$ and $n$ of the resistor 28 increases, to increase a dc exciting current supplied across the exciting winding 31 of the saturable core reactor 30 resulting in a decrease in impedance of the reactor 30. Therefore, it will be apparent that control of the intermediate terminal $n$ causes an increase in magnitude of the current flowing through the reactor 30 or causing the workpiece to act as the anode electrode while at the same time greatly suppressing the magnitude or current flowing through the reactor 33 or causing the workpiece to act as the cathode electrode with the result that the current waveform as illustrated in FIG. 4 is produced.

In FIG. 2, if the variable capacitors 35 and 36 are adjusted in capacitance, their impedances, represented by $1/wc$ where $w$ is the angular velocity of the source voltage and $C$ is the capacity of the associated capacitor, controls currents flowing therethrough. More specifically, a decrease in capacity of the capacitor 35 causes an increase in its impedance, thereby suppressing a current flowing through the capacitor or causing the workpiece to act as the cathode electrode while the machining electrode acts as the anode electrode, resulting in low magnitude of the current. On the other hand, an increase in capacity of the capacitor 35 causes a decrease in its impedance, thereby increasing the current flowing through the same or having such polarity that the workpiece acts as the anode electrode. In this way a current waveform as illustrated in FIG. 4 is provided as in FIG. 2.

In the circuitry shown in FIG. 3 the saturable core reactors 30 and 33 and the variable capacitors 35 and 36 can be controlled in the manners above described in conjunction with FIGS. 1 and 2, whereby a current waveform as illustrated in FIG. 4 is applied to the machining gap 3.

Figure 5:
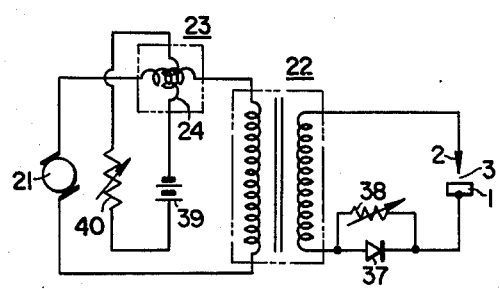
FIGS. 5 through 8 are diagrams of modifications of electric circuits embodying the invention.
Figure 6:
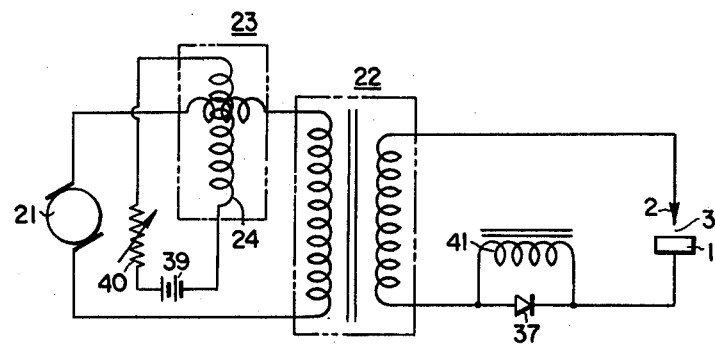
Figure 7:
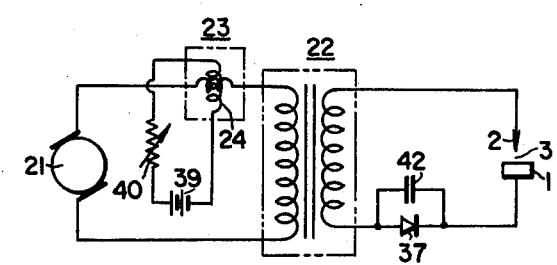

Referring now to FIGS. 5, 6 and 7 wherein the same reference numerals designate the components corresponding to those shown in FIGS. 1, 2 and 3, there are illustrated other modification of the invention by which a current waveform as illustrated in FIG. 4 is applied to a machining gap, to effect highly efficient machining of workpieces with a negligible wear of machining electrodes involved.

A circuitry illustrated in FIG. 5 includes a parallel combination of a rectifier or a semiconductor diode 37, and a variable resistor 38 connected in a circuit connecting an output of a power transformer 32 across a workpiece 1 and a machining electrode 2. The semiconductor diode 37 is so poled that it permits a current causing the workpiece 1 to act as the anode electrode to flow therethrough. The resistor 38 is of such a high resistance that a flow of current therethrough causing the workpiece to act as the cathode electrode can be suppressed to a small extent shown by curve portion positioned below the time axis in FIG. 4. Thus it will be appreciated that the circuitry illustrated provides a current waveform as illustrated in FIG. 4 for the machining gap 3. In order to control an input voltage to the transformer 22, the circuitry may conveniently comprise a source of direct current connected to an exciting winding 24 of a saturable core reactor 23 through a variable resistor 40.

The circuitry in FIG. 5 was operated to electrolytically machine workpieces including, by weight, 92% of tungsten carbide, 2% of the total of titanium and tantalum carbides and 6% of cobalt for 5 minutes. The machining electrode 2 was made of a brass containing 60% Cu and 40% Zn and had an outside diameter of 12 mm and an inside diameter of 6 mm. An electrolyte solution 9 comprised an aqueous solution of 20% sodium chloride. The machining gap was maintained as narrow as possible in order not to cause a short circuit in operation. The results of the experiments are listed in Table 1.

cally machined increases, to permit the workpieces to be more rapidly machined.

It has been found that the addition of one or more water soluble, highly dissociable or ionizable alkali metal compounds to the electrolyte solution, which thereby increases the concentration of alkali metal ions, is effective in promoting the solution of the insoluble oxides.

Instead of sodium hydroxide, for example, sodium carbonate $Na_2CO_3$ and/or sodium bicarbonate $NaHCO_3$ may be advantageously added to the aqueous solution of sodium chloride in order to increase the concentration of sodium ions $Na^+$. In fact, either of such compounds is substantially electrolytically dissociated in the

TABLE 1

| Resistance of Resistor 38 in ohm | Current A through Gap 3 in A | Machined Amount of Workpiece A | | Worn Amount of Machining Electrode 2 | | *Relative Wear in % | Machining Rate | |
|---|---|---|---|---|---|---|---|---|
| | | Depth of Bore in mm | Removed Weight in g. | Worn Length in mm | Loss of Weight in g | | in mm/min. | Gr/100A.min. |
| 0 | 65 | 1.00 | 1.26 | 4.10 | 2.89 | 299 | 0.20 | 0.39 |
| 0.1 | 55 | 1.05 | 1.32 | 3.85 | 2.72 | 206 | 0.21 | 0.48 |
| 0.2 | 45 | 1.45 | 1.82 | 3.15 | 2.22 | 122 | 0.29 | 0.81 |
| 0.3 | 40 | 1.50 | 1.89 | 2.55 | 1.80 | 95 | 0.30 | 0.95 |

*Relative wear = $\frac{\text{Worn amount of electrode in g.}}{\text{Machined amount of workpiece in g.}} \times 100$ From Table 1 it will be appreciated that the resistor 38 serves to increase the machined amount of the workpiece and to decrease the wear of the electrode.

A circuitry shown in FIG. 6 includes an inductance 41 instead of the resistor 38 and a circuitry shown in FIG. 7 includes a capacitor 42 substituting that resistor. As in FIG. 5, each of these circuities can provide a current waveform such as illustrated in FIG. 4 for the associated machining gaps, by having their impedances due to the inductance 41 or capacitor 42 properly controlled as the case may be.

The invention also contemplates the provision of electrolytic machining systems adapted to efficiently erode workpieces of sintered tungsten carbide alloy materials wherein the performance of such electrolytic machining systems are prevented from deteriorating even during long service. As previously described, the wear of the machining electrode has now been reduced to a minimum by using a current waveform as illustrated in FIG. 4. Therefore, improvements in the electrolyte solution will accomplish the purposes just described.

According to the previously mentioned chemical reactions effected during electrolysis of the electrolyte solution, the dissolution of tungsten, titanium and tantalum oxides, $WO_3$, $TiO_2$ and $Ta_2O_5$, respectively into the electrolyte solution is attributable to the actions of sodium ions $Na^+$ present in the solution. Therefore, in order to increase the concentration of sodium ions in the solution, a proper amount of sodium hydroxide NaOH may preferably be added to the solution. Under these circumstances, it will be apparent that when electrical energy having a polarity such that the workpiece 1 acts as the cathode electrode is being supplied to the machining gap 3, the increased amount of sodium ions $Na^+$ can react readily with the oxides of tungsten, titanium and tantalum, $WO_3$, $TiO_2$ and $Ta_2O_5$, respectively, to rapidly dissolve the resulting products in the electrolyte solution thereby promoting the erosion of the workpiece. As a result, the rate at which the workpieces of the above mentioned alloy materials are electrolytielectrolyte solution and thereby increases the concentration of sodium ions $Na^+$.

It is recalled that like sodium ions $Na^+$, other alkali metal ions, such as potassium ions $K^+$ are effective in dissolving the metal oxides, as previously described, in the electrolyte solution. Therefore, the presence of other alkali metal ionizable compounds such as potassium hydroxide KOH, potassium carbonate $K_2CO_3$ and/or potassium bicarbonate $KHCO_3$ in the NaCl solution can also promote the erosion of workpieces. If an aqueous solution of potassium chloride is used as the electrolyte solution, one or more alkali metal hydroxide, i.e. caustic alkalis including sodium hydroxide, potassium hydroxide, and alkali carbonates i.e., sodium carbonate, sodium bicarbonate, potassium carbonate and potassium bicarbonate may also be added thereto.

In order to increase the concentration of sodium ions $Na^+$ or potassium ions $K^+$ in the electrolyte solution, an increased amount of sodium chloride or potassium chloride may be added to form the aqueous electrolyte solution. However, sodium and potassium chlorides have respective solubility limits in water above which, the further addition thereof does not lead to an increase in concentration of the corresponding ions. Each of the caustic alkalies and alkali carbonates is more soluble in water than sodium and potassium chloride. Thus, the addition of any one or more of the caustic alkalies and alkali carbonates to an aqueous solution of sodium chloride or potassium chloride can cause an increase in concentration of sodium or potassium ions, $Na^+$ or $K^+$ respectively.

Also, it is to be noted that sodium or potassium ions in the electrolyte solution react with tungsten carbide and the like in the machining operation of a workpiece thereby decreasing in concentration progressively as the reactions proceed. However, if any one or more of caustic alkalis and alkali carbonates has been added to the electrolyte solution to increase the concentration of sodium or potassium ions, as the case may be, then any decrease in concentration of such ions in the machining operation does not lead to a deterioration of the electrolyte solution and the machining efficiency does not decrease even during long service.

In order to determine the relationship between the amount of alkali metal compound added to the electrolyte solution and the machining rate, the circuitry as illustrated in FIG. 5 was operated to electrolytically machine workpieces composed of a sintered, high cobalt tungsten alloy material marked under the name "IGETALLOY G8" (75% tungsten carbide and 25% cobalt — by weight) by the Sumitomo Metal Company in Japan, in an aqueous solution containing 20% sodium chloride while progressively increasing the amount of sodium hydroxide NaOH added to the solution. The machining electrode 2 was composed of brass containing 60% Cu and 40% Zn and had outside diameter of 12 mm and an inside diameter of 6 mm. In FIG. 5 the resistor 38 was chosen to have a value of resistance of 0.3 ohm and the power transformer 22 had an output voltage of 12 volts at no load state. Under these conditions, the machining rate and the worn amount of the electrode were measured and the results are listed in the following Table 2.

which in turn are dissolved in the solution, resulting in wear of the machining electrode. These chemical reactions are similar to the reaction of the binder cobalt as above described. Thus it will be understood that a relative decrease in concentration of chloride ions in the electrolyte solution, due to the addition of sodium hydroxide, leads to the difficulty in dissolving the copper and zinc of the electrode into the electrolyte solution, with the result that the wear of the electrode decreases.

As previously described, sodium hydroxide may be replaced by an alkali metal compound which is completely dissociated, i.e. ionized in water and thereby provides alkali metal ions which are effective in dissolving the oxides. Preferably, the alkali metal compounds used in this invention are selected from the group consisting of potassium hydroxide KOH, sodium carbonate $Na_2CO_3$, potassium carbonate $K_2CO_3$, sodium bicarbonate $NaHCO_3$ and potassium bicarbonate $KHCO_3$. The results of experiments conducted with varying amounts of the latter compounds indicate that the machining rate for each of the compounds has a trend similar to that found using varying amounts of sodium hydroxide. This

TABLE 2

| Amount of Added NaOH in Weight % | Current through Gap in A | Machining Time in min. | Machined Amount of Workpiece | | Worn Amount of Machining Electrode in g. | Relative Wear in % | Machining Rate | | |
|---|---|---|---|---|---|---|---|---|---|
| | | | Depth of Bore in min. | Removed Weight in g. | | | in mm/min. | in g./min. | in g./ 100A.min. |
| 0 | 35 | 4.5 | 1.25 | 1.4 | 1.4 | 100 | 0.25 | 0.31 | 0.89 |
| 1 | 35 | 5.0 | 1.35 | 1.5 | 0.6 | 40 | 0.27 | 0.30 | 0.86 |
| 2 | 37 | 5.0 | 1.70 | 1.9 | 0.2 | 1.5 | 0.34 | 0.38 | 1.03 |
| 3 | 37 | 5.0 | 1.80 | 2.0 | 0.2 | 10.0 | 0.36 | 0.40 | 1.08 |
| 4 | 38 | 5.0 | 2.05 | 2.3 | 0.1 | 4.4 | 0.41 | 0.46 | 1.21 |
| 5 | 35 | 5.0 | 1.15 | 1.3 | 0.1 | 6.3 | 0.23 | 0.26 | 0.74 |
| 6 | 34 | 5.0 | 0.70 | 0.8 | 0.1 | 12.5 | 0.14 | 0.16 | 0.47 |

Figure 18:
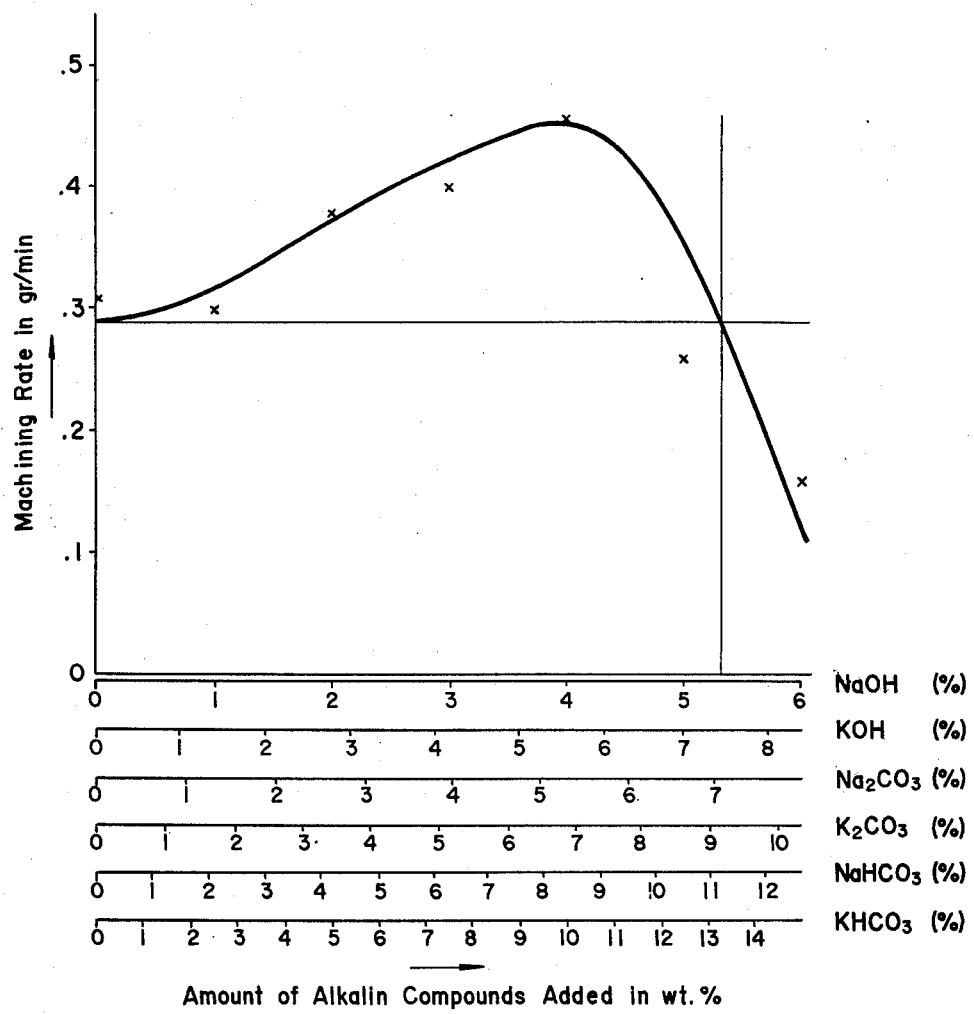
FIG. 18 is a graph plotting amounts of alkaline compounds added to an electrolyte solution with sodium chloride against a machining rate obtained in the arrangement illustrated in FIG. 5.

Based upon the data shown in Table 2 the graph illustrated in FIG. 18 was obtained. In FIG. 18, the ordinate represents the machining rate in grams per minute and the abscissa represents the amount of sodium hydroxide in weight per cent added to the electrolyte solution. FIG. 18 illustrates certain alkali metal compounds other than sodium hydroxide which will be described hereinafter. It will be appreciated from FIG. 18 that the addition of sodium hydroxide in an amount up to 5.3% based upon the weight of the electrolyte solution results in an increase in machining rate. As shown in FIG. 18, the addition of the sodium hydroxide exceeding 5.3% decreases the machining rate for reasons that will be described. An increase in the amount of sodium hydroxide added to the electrolyte solution and hence the concentration of sodium ions in the solution means a relative decrease in concentration of chloride ions in the solution. As previously described, chloride ions serve to dissolve the binder cobalt contained in the sintered tungsten alloy materials in the electrolyte solution. Thus it will be understood that the relative decrease in concentration of chloride ions in the solution results in a low rate of removal of cobalt from the material to be worked.

From Table 2 it will also be apparent that the addition of sodium hydroxide to the electrolyte solution causes a decrease in the wear of the machining electrode and therefore in the relative wear. This may be explained as follows: With the machining electrode composed of a brass or copper-zinc alloy material, the copper and zinc contained in the electrode react with chloride ions when the electrode is acting as the anode electrode, to form copper chloride and zinc chloride, respectively, has been expressed by a curve shown in FIG. 18 with the unit of the abscissa modified. From FIG. 18 it will be appreciated that, for purpose of increasing the machining rate, the electrolyte solution may have added thereto up 0 to 7.5% by weight of potassium hydroxide KOH, up to 7.1% by weight of sodium carbonate $Na_2CO_3$, up to 9.2% by weight of potassium carbonate $K_2CO_3$, up to 11.2% by weight of sodium bicarbonate $NaHCO_3$, or up to 13.3% by weight of potassium bicarbonate $KHCO_3$ —provided an alkali metal chloride of sodium chloride NaCl or potassium chloride KCl is present in the electrolyte solution in an amount of from 5% to saturation.

It has been found that for the aqueous solution of either sodium chloride or potassium chloride having a concentration of from 5% to the saturated value, any one of the abovementioned alkali metal compounds may be used in an amount up to the value just specified for the purpose of increasing the machining rate.

Additional experiments were run to determine the interrelationships between the loss of machining electrode and the machining rate versus amount of NaOH in the electrolyte and the ohmic value of the biasing resistor. The results of these experiments are shown graphically in FIGS. 20 and 21.

Figure 20:
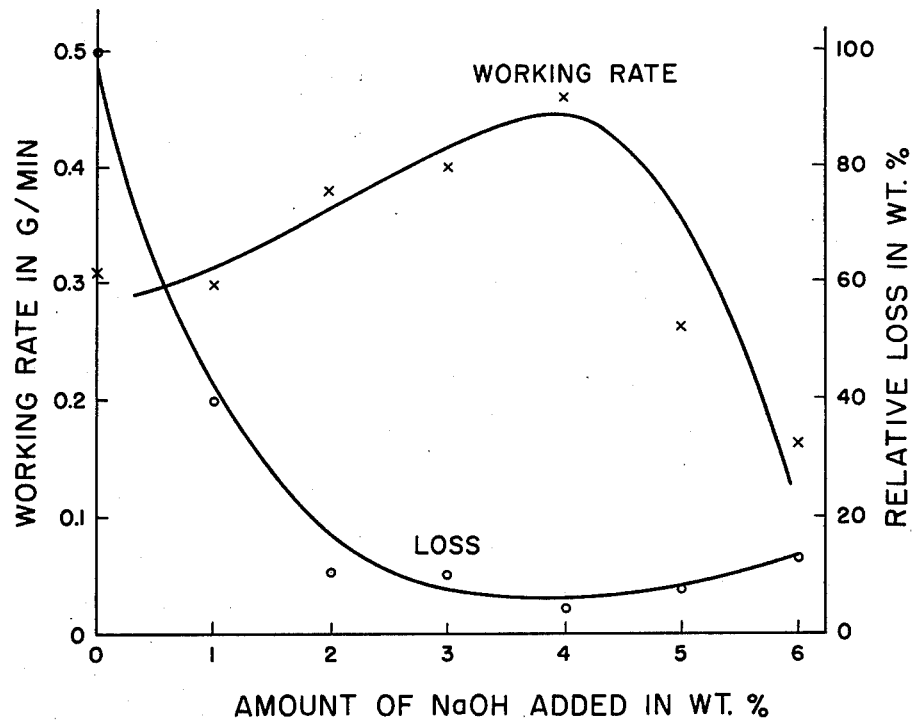
FIGS. 20 and 21 are graphs showing the effects of varying amounts of NaOH in the electrolyte composition and varying values of biasing resistance.

In FIG. 20, the varying amounts of NaOH (in weight percent) added to the electrolyte are represented along the abscissa and the working rate and relative loss are represented along two ordinates. The "relative loss" parameter is defined as the amount loss of machining electrode relative to amount loss of workpiece and hence the higher the value thereof, the greater the amount consumption of the machining electrode and the more disadvantageous the electrolytic solution. In the running of the tests which are plotted in FIG. 20 the value of the biasing resistor was kept constant at 0.3 ohms.

Figure 21:
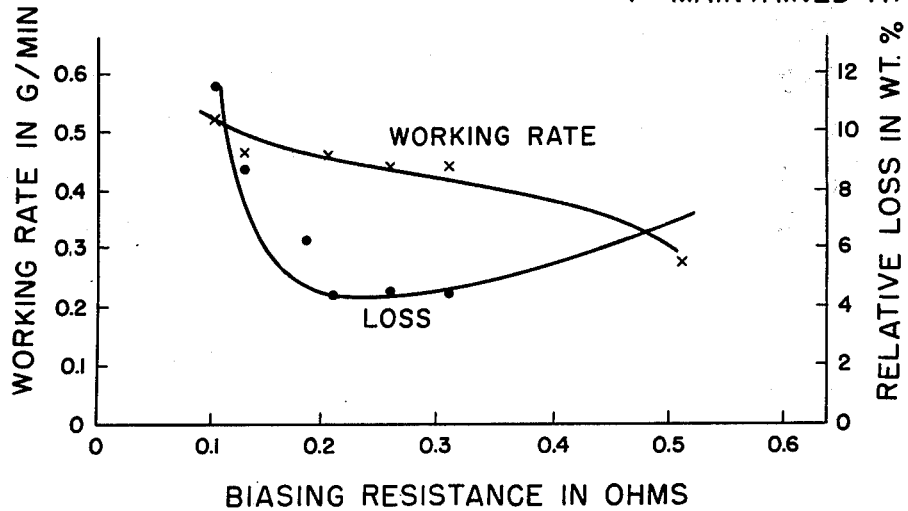

In FIG. 21, the abscissa depicts the varying values of biasing resistance and the ordinates are similar to those of FIG. 20. In the tests whose results are plotted in FIG. 21, the amount of NaOH in weight percent in the electrolytic solution was maintained at 4%.

From an examination of FIGS. 20 and 21 it can be seen that the working rate is greatest when the NaOH is present within the range 3%-4.5% and is maximum at about 4.0%. Also, the relative loss is least when the NaOH content is within the foregoing range. Moreover, the relative loss is minimized when the biasing resistor has a value of 0.2-0.3 ohms.

According to another feature of the invention, workpieces of sintered tungsten carbide alloy materials can be efficiently machined with the complete elimination of wear to the machining electrodes in operation. To this end, an electrolytic solution can contain an increased concentration of sodium or potassium ions as above described, and there is applied across the machining gap, a pulsed electrical energy having a cycle portion in which its magnitude is null when the workpiece acts as the anode electrode Therefore, electrical energy of such polarity that the machining electrode acts as the anode electrode is not supplied at all across the machining gap, with the result that no wear of the machining electrode occurs.

With the expedient just described, upon reducing the magnitude of the supplied electrical energy to substantially zero, tungsten, titanium and tantalum oxides, formed on the surface of the workpiece when the workpiece acts as the anode electrode, are combined with sodium or potassium ions in the electrolyte solution, and are dissolved into the solution, whereby the workpiece is electrolytically machined at a higher rate.

Further the absence of a supply of electrical energy in the machining gap of such polarity that the workpiece 1 acts as the cathode electrode, prevents sodium or potassium ions in the electrolyte solution from being attracted by the workpiece acting as the cathode electrode. However, it is to be noted that the electrolyte solution involved should contain a high concentration of sodium or potassium ions whereby, upon reducing the electrical energy of the polarity which causes the workpiece to act as the anode electrode to substantially null magnitude, sodium or potassium ions are combined with the various oxides as above described. In other words, the system is based upon the fact that, if an electrolyte solution containing the high concentration of sodium or potassium ions is used, then tungsten, titanium and tantalum oxides are readily combined with sodium or potassium ions, even though the electrical energy of the polarity which causes the workpiece to act as the cathode electrode is not applied across the machining gap. This system is exceedingly advantageous in that the machining electrode is not at all worn; thereby the degree of machining accuracy is greatly improved.

Figure 8:
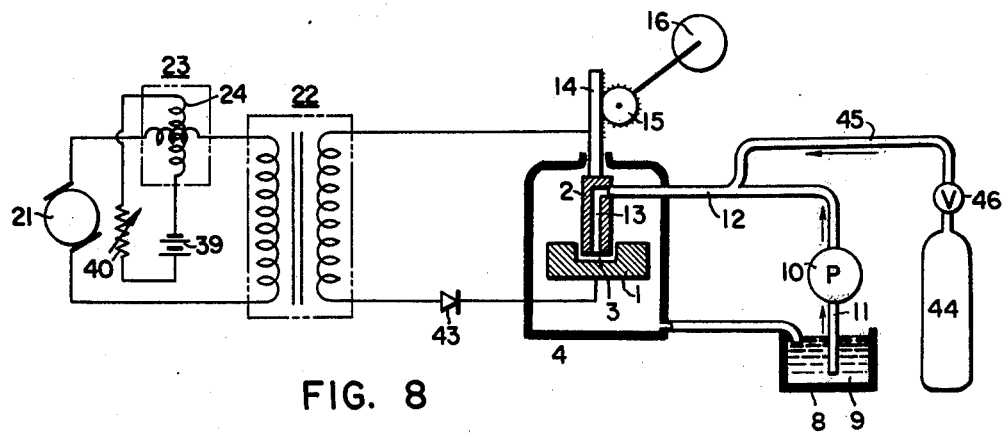
Figure 9:
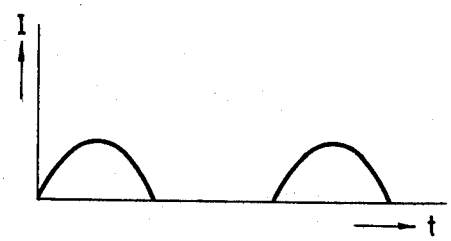
FIG. 9 is a diagram of a waveform of current flowing through a machining gap illustrated in FIG. 8.

The feature of the invention as above described can be embodied in the form of an arrangement illustrated in FIG. 8. The arrangement illustrated includes a rectifier or a semiconductor diode 43 connected in a circuit connecting an output of a power transformer 22 to a workpiece 1 and so poled that only a current to cause the workpiece 1 to act as the anode electrode is permitted to flow therethrough. Thus in the alternate half cycles of the power a current waveform as illustrated in FIG. 9 is supplied to a machining gap 3.

The arrangement further may include a gas reservoir 44 operatively connected to a conduit 12 from a feed pump 10 through a conduit 45 and a pressure reducing valve 46 in order to increase its machining rate. However, such a measure does not form a part of the invention and therefore is not further described. The other respects are the same as those previously described in conjunction with FIGS. 1 and 5 and need not be here described.

As an example, a workpiece made of a sintered tungsten carbide alloy comprising, by weight, 92% of tungsten carbide and 8% of cobalt may be formed with a bore 0.7 mm deep in 5 minutes, by the apparatus shown in FIG. 8 including machining electrode 2 made of a brass containing 60% Cu and 40% Zn having an outside and an inside diameter of 12 and 6 mm respectively, and an electrolyte solution comprised of 150 grams of NaCl and 50 grams of NaOH for each 1000 cc. of water. The electrolyte solution flowed at 5 liters per minute through the machining gap across which a voltage having an average magnitude of 11 volts was applied and through which a current of 20 amperes flowed.

The experiments as previously described in conjunction with FIGS. 5 and 18 were repeated with the arrangement illustrated in FIG. 8 except that the workpieces were composed of 92% by weight of tungsten carbide, 2% by weight of the total of titanium carbide and tantalum carbide and 6% by weight of cobalt. The results of the experiments are listed in the following Table 3.

TABLE 3

| Amount of NaOH Added in Weight % | Current Through Gap in A | Machining Time in min. | Machined Amount of Workpiece | | Machining Rate | | |
|---|---|---|---|---|---|---|---|
| | | | Depth of Bore in mm. | Removed Weight in g. | in mm./min. | in g./min. | in g./100A.min. |
| 1 | 16–26 | 15 | 2.00 | 2.52 | 0.133 | 0.17 | 1.05 |
| 2 | 20–48 | 15 | 3.40 | 4.28 | 0.227 | 0.29 | 1.43 |
| 3 | 26–62 | 15 | 3.85 | 4.84 | 0.256 | 0.32 | 1.24 |
| 4 | 28–70 | 15 | 4.20 | 5.28 | 0.280 | 0.35 | 1.25 |
| 5 | 32–85 | 15 | 4.60 | 5.78 | 0.306 | 0.39 | 1.20 |
| 6 | 35–43 | 5 | 1.45 | 1.82 | 0.290 | 0.36 | 1.04 |
| 7 | 40–60 | 5 | 1.55 | 1.95 | 0.310 | 0.39 | 0.98 |
| 8 | 45–65 | 5 | 1.65 | 2.07 | 0.330 | 0.41 | 0.92 |
| 9 | 50–70 | 5 | 1.80 | 2.26 | 0.360 | 0.45 | 0.90 |
| 10 | 40–60 | 5 | 1.65 | 2.07 | 0.330 | 0.41 | 1.04 |

The above Table 3 also indicates that as the amount of sodium hydroxide added to the electrolyte solution increases the machining rate increases.

Figure 10:
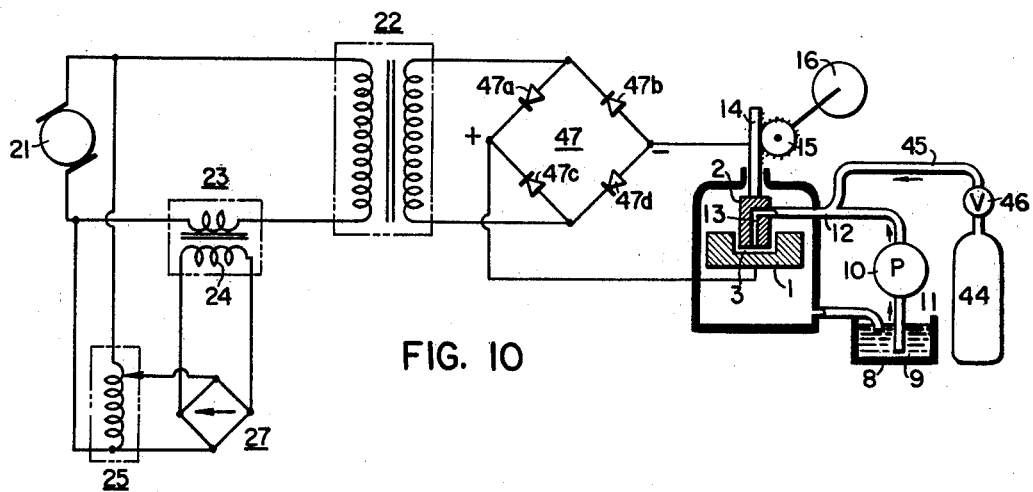
FIGS. 10, 12, 14 and 16 are schematic diagrams of other forms of electric circuits embodying the invention.
Figure 11:
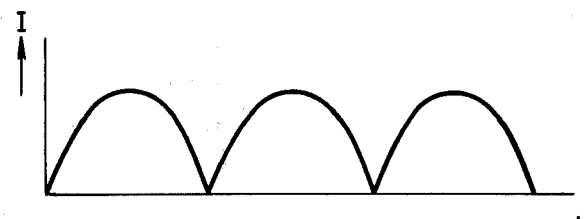
FIGS. 11, 13, 15 and 17 are waveforms of current flowing through machining gaps in apparatus illustrated in FIGS. 10, 12, 14 and 16 respectively.

An arrangement illustrated in FIG. 10 was constructed in accordance with the principles of the invention as above described in conjunction with FIG. 8. The arrangement illustrated includes a full wave rectifier device of bridge type comprising four rectifiers or semiconductors diodes 47a, 47b, 47c and 47d. The other respects are substantially the same as those previously described. The rectifier device 47 serves to full-wave rectify an output from a power transformer 22 and to supply to a machining gap 3 a current waveform as illustrated in FIG. 11. Therefore, a current of polarity to cause a workpiece 1 to act as the cathode electrode is not applied to the machining gap 3 resulting in the prevention of electrode wear. Since the electrolyte solution involved includes sodium or potassium ions of high concentration, the carbides of tungsten, titanium and tantalum formed on the surface of the workpiece react with the ions, and are dissolved in the solution upon reducing the flow of current through the machining gap to substantially zero magnitude.

In order to indicate the effect of the concentration of sodium ions on the electrolytic machining process, the apparatus illustrated in FIG. 10 was operated to electrolytically machine workpieces including, by weight, 92% of tungsten carbide, 2% of the total of titanium and tantalum carbides and 6% of cobalt, with the concentration of sodium ions in the machining solution successively increased. For this purpose, an increment amount of sodium hydroxide in the solution was successively increased. The machining electrode used was made of a brass containing 60% Cu and 40% Zn and had an outside and an inside diameter of 12 and 6 mm., respectively. The transformer 22 had an output voltage of 12 volts at no load state. The results obtained are indicated in Table 4.

TABLE 4

| Amount of NaOH Added in % | Current Through Gap in A | Machining Time in min. | Machined Amount of Workpiece | | Machining Rate | |
|---|---|---|---|---|---|---|
| | | | Depth of Bore in mm. | Removed Amount in g. | in mm./min. | g./min. |
| 2 | 25 | 5.0 | 0.90 | 1.2 | 0.18 | 0.24 |
| 4 | 58 | 5.0 | 1.55 | 2.4 | 0.31 | 0.48 |
| 6 | 70 | 5.0 | 2.30 | 3.6 | 0.46 | 0.72 |
| 8 | 75 | 5.5 | 2.80 | 4.2 | 0.51 | 0.76 |
| 9 | 80 | 5.0 | 2.60 | 3.6 | 0.52 | 0.72 |
| 10 | 85 | 5.0 | 3.00 | 4.3 | 0.60 | 0.86 |
| 12 | 110 | 5.0 | 3.00 | 4.5 | 0.60 | 0.92 |

From Table 4 it will be apparent that an increase in concentration of sodium ions in the electrolyte solution causes an increase in the machining rate. This is also true in the case of potassium ions. Also it has been found that the bores formed had a very high degree of accuracy without wear of the machining electrode.

Figure 19:
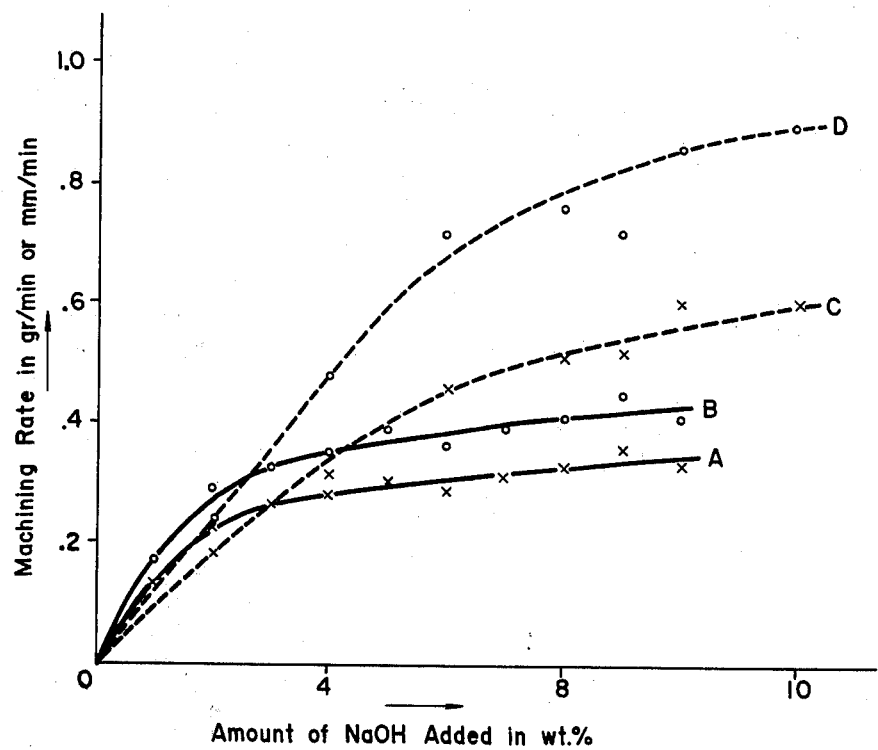
FIG. 19 is a graph similar to FIG. 18 but representing data obtained in the arrangements of FIGS. 8 and 10 using an electrolyte solution containing sodium chloride and a variable amount of sodium hydroxide.

FIG. 19 illustrates a graph based upon the data given in Tables 3 and 4. In FIG. 19, the abscissa represents an amount of sodium hydroxide, in weight percent, added to the electrolyte solution and the ordinate represents a machining rate in grams per minute and millimeter per minute. Solid curve A depicts the machining rate in millimeter per minute for Table 3 and solid curve B depicts the machining rate in grams per minute for Table 3. Dotted curve C represents the machining rate in millimeters per minute for Table 4 and dotted curve D represents the machining rate in grams per minute for Table 4.

From FIG. 19 it will be appreciated that even if a sufficiently high amount of sodium hydroxide, for example, up to the saturation amount (which is approximately 12% by weight for an aqueous solution of 20% sodium chloride) is added to the electrolyte solution, the machining rate can be expected to increase. It has been found that this is true in the case of potassium hydroxide, sodium carbonate, potassium carbonate, sodium bicarbonate or potassium bicarbonate.

The period of the operational cycle during which no electric energy is supplied to the machining gap is not necessarily equal to a half cycle of alternating current power and may be reduced as desired, as will be subsequently described in conjunction with FIGS. 12 through 17.

Figure 12:
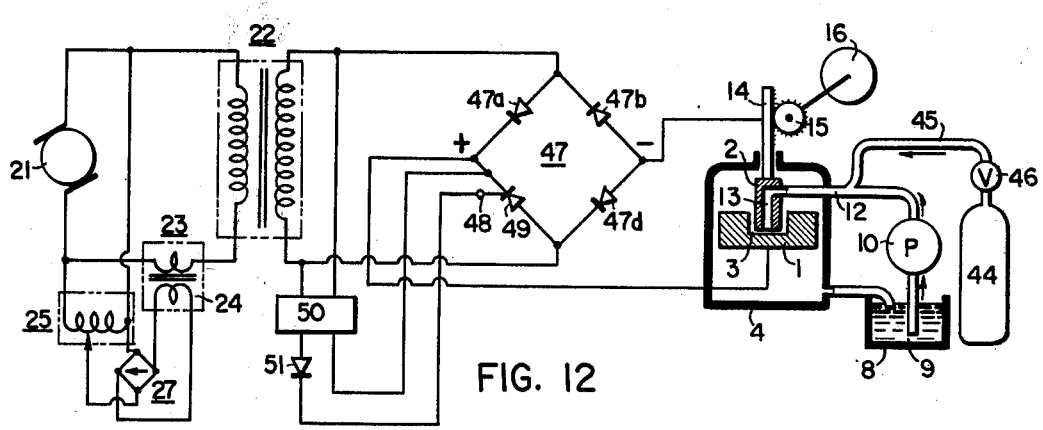
Figure 13:
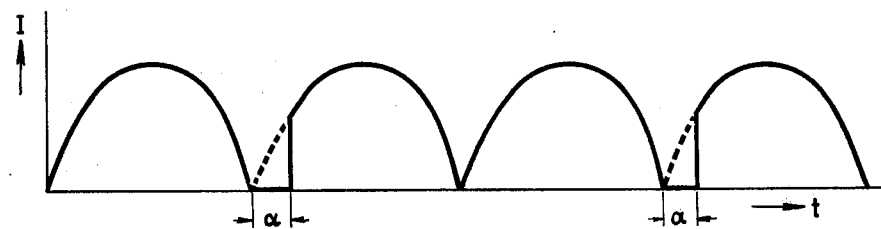

FIG. 12 illustrates a modification of the invention wherein one of the rectifiers of the device 47 for example, the rectifier 47e shown in FIG. 10 is replaced by a semiconductor controlled rectifier 48 including a control electrode 49. In order to control conduction of the controlled rectifier 48, a phase shifter 50 is connected across a secondary winding of a power transformer 22 and has one of its output terminals connected to the cathode of the controlled rectifier 48 and the other output terminal connected to the control electrode 49 of the rectifier 48 through a rectifier or semiconductor diode 51. With the arrangement illustrated, a firing angle at which the controlled rectifier 48 is fired by an output voltage in a direction of $e_2$ from the transformer 22 is controlled and a current waveform as illustrated in FIG. 13 is supplied to a machining gap 3. As shown in FIG. 13, the current flowing through the gap has a zero magnitude during the period a at the beginning of the alternate half cycles whereas the output voltage from the transformer is not affected. It is to be understood that an electrolyte solution containing a high concentration of sodium or potassium ions is used. It has been found that the arrangement results in effective electrolyte machining without any wear to the machining electrode.

Figure 14:
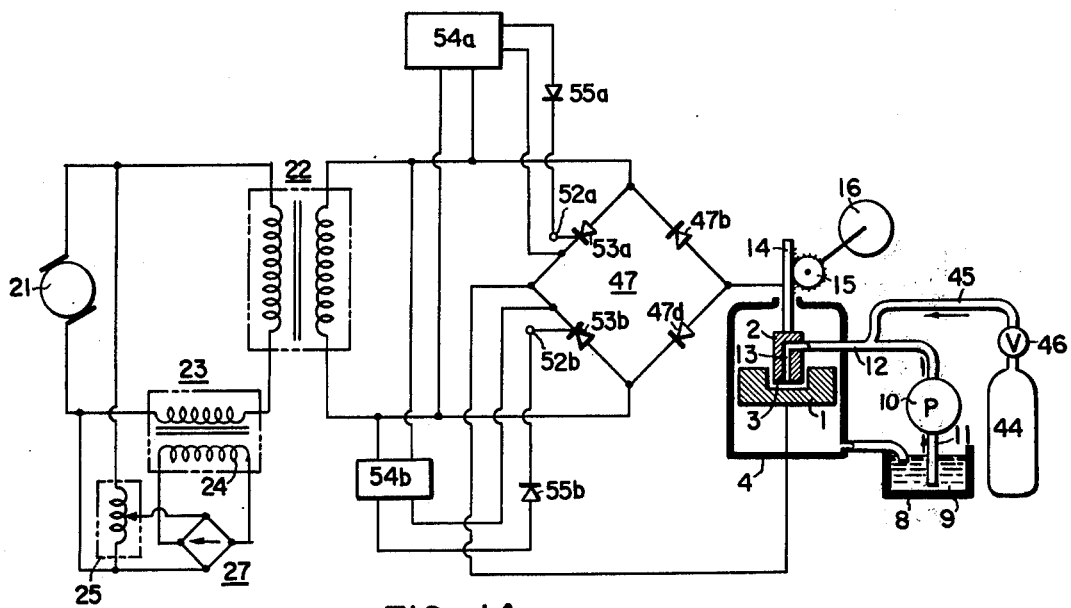
Figure 15:
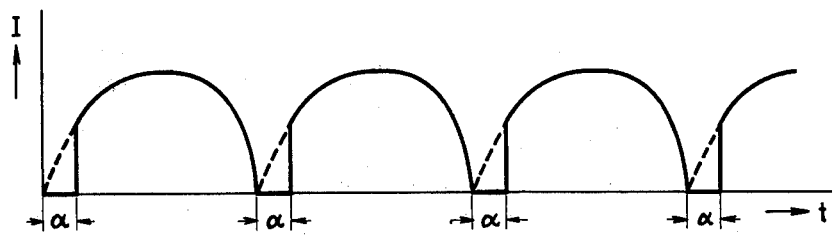
Figure 17:
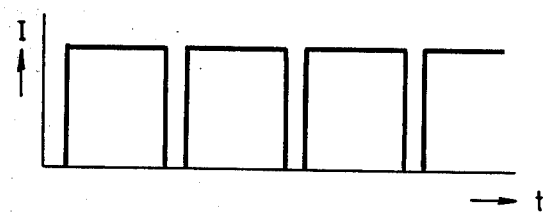

FIG. 14 illustrates another modification of the invention in which a pair of adjacent rectifiers 47a and 47c of the device 48 shown in FIG. 10 are replaced by a pair of semiconductor controlled rectifiers 52a and 52b having the individual control electrodes 53a and 53b respectively. A pair of phase shifter 54a and 54b are connected to control conduction of the controlled rectifiers 52a and 52b through rectifiers 55a and 55b. Thus the firing angle at which the rectifier device 48 is fired, is controlled by the portions of output in the both directions of $e_1$ and $e_2$ from a power transformer 22 and supplies to the machining gap, a current waveform as illustrated in FIG. 17.

Figure 16:
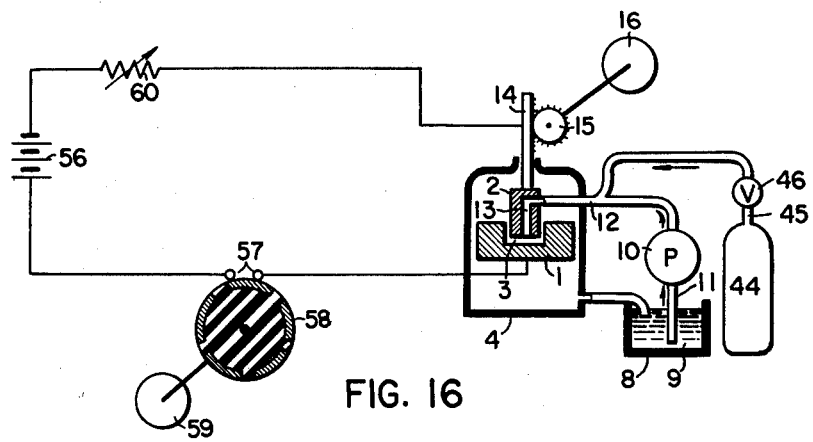

FIG. 16 illustrates another modification of the invention in which a current waveform provided for a machining gap is mechanically controlled. An arrangement illustrated in FIG. 16 includes a source of direct current 56, contacts 57 disposed in a circuit for supplying an output from the source 56 across a machining gap 3, a rotatable contactor 58 of drum type and an electric motor 59 for driving the contactor 58. In operation, the motor 59 is energized to rotate the contactor 58 whereby a current waveform as illustrated in FIG. 17 is supplied from the source 56 through the contacts 57 to the gap 3 and thence to the source through a resistor 60.

As in the previously described embodiments of the invention, this modification can electrolytically machine workpieces of sintered tungsten carbide alloys with a high efficiency and without any consumption of the machining electrode.

While the invention has been illustrated and described in conjunction with certain preferred embodiments thereof it is to be understood that various modifications and changes may be made without departing from the spirit and scope of the invention.

What is claimed is:

1. A method for electrolytically machining a workpiece consisting essentially of tungsten carbide alloy comprising the steps of: positioning a machining electrode opposite a surface portion of a workpiece consisting essentially of tungsten carbide alloy to form a small machining gap therebetween; flowing an aqueous electrolyte solution through said machining gap, said electrolyte solution consisting essentially of 5% to saturated value by weight of an alkali metal chloride selected from a group consisting of sodium chloride and potassium chloride, and an alkali metal compound selected from the group consisting of 3.6%–5.3% by weight of sodium hydroxide, up to 7.5% by weight of potassium hydroxide, up to 7.1% by weight of sodium carbonate, up to 9.2% by weight of potassium carbonate, up to 11.2% by weight sodium bicarbonate, and up to 13.3% by weight potassium bicarbonate; and passing an alternating electric current through said electrolyte solution in said machining gap, through said workpiece and through said machining electrode to render said workpiece anodic during part of the cycle of said alternating current to form oxides on the workpiece and to render said workpiece cathodic during the reverse part of the cycle of said alternating current to dissolve said oxides.

2. A method according to claim 1; wherein said electrolyte solution contains about 4% by weight of sodium hydroxide.

3. A method according to claim 1; wherein said electrolyte solution contains 3.6%–5.3% by weight of sodium hydroxide.

4. A method according to claim 1; wherein said electrolyte solution contains up to 7.1% by weight of sodium bicarbonate.

5. A method according to claim 1; wherein said electrolyte solution contains up to 9.2% by weight of potassium bicarbonate.

6. A method according to claim 1; wherein said electrolyte solution contains up to 11.2% by weight of sodium bicarbonate.

7. A method according to claim 1; wherein said electrolyte solution contains up to 13.3% by weight of potassium bicarbonate.

8. A method for electrolytically machining a workpiece consisting essentially of sintered tungsten carbide alloy having added thereto titanium carbide and/or tantalum carbide comprising the steps of: positioning a machining electrode opposite a surface portion of a workpiece consisting essentially of sintered tungsten carbide alloy having added thereto titanium carbide and/or tantalum carbide to form a small machining gap therebetween; flowing an aqueous electrolyte solution through said machining gap, said electrolyte solution consisting essentially of 5% to saturated value by weight of an alkali metal chloride selected from a group consisting of sodium chloride and potassium chloride, and an alkali metal compound selected from the group consisting of 3.6%–5.3% by weight of sodium hydroxide, up to 7.5% by weight of potassium hydroxide, up to 7.1% by weight of sodium carbonate, up to 9.2% by weight of potassium carbonate, up to 11.2% by weight of sodium bicarbonate, and up to 13.3% by weight of potassium bicarbonate; and passing an alternating electric current through said electrolyte solution in said machining gap, through said workpiece and through said machining electrode to render said workpiece anodic during part of the cycle of said alternating current to form oxides including water-soluble tungsten oxide and titanium oxide and/or tantalum oxide on the workpiece surface and to render said workpiece cathodic during the reverse part of the cycle of said alternating current to cause said water-insoluble oxides to react with alkali metal ions in said electrolyte solution to form reaction products which are soluble in water to thereby dissolve said oxides and prevent oxide accumulation on the workpiece surface.

9. A method according to claim 8; wherein said electrolyte solution contains 3.6%–5.3% by weight of sodium hydroxide.

10. A method according to claim 8; wherein said electrolyte solution contains up to 7.1% by weight of sodium bicarbonate.

11. A method according to claim 8; wherein said electrolyte solution contains up to 9.2% by weight of potassium bicarbonate.

12. A method according to claim 8; wherein said electrolyte solution contains up to 11.2% by weight of sodium bicarbonate.

13. A method according to claim 8; wherein said electrolyte solution contains up to 13.3% by weight of potassium bicarbonate.

* * * * *